United States Patent
Sun et al.

(10) Patent No.: US 12,430,223 B2
(45) Date of Patent: Sep. 30, 2025

(54) DYNAMICALLY ADJUSTING TRACING DECISIONS BASED ON THE COLLECTED MONITORING DATA

(71) Applicant: International Business Machines Corporation, Armonk, NY (US)

(72) Inventors: Yong Hu Sun, Beijing (CN); Xiao Juan Niu, Beijing (CN); Li Jian Wang, Beijing (CN); Pei Ran Han, Beijing (CN); Xing Tian, Beijing (CN); Shao Rong Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 18/406,900

(22) Filed: Jan. 8, 2024

(65) Prior Publication Data
US 2025/0225052 A1    Jul. 10, 2025

(51) Int. Cl.
*G06F 11/34* (2006.01)

(52) U.S. Cl.
CPC .... *G06F 11/3466* (2013.01); *G06F 2201/865* (2013.01)

(58) Field of Classification Search
CPC ............ G06F 11/0778; G06F 11/0781; G06F 11/3466; G06F 11/3495; G06F 11/3612;
(Continued)

(56) References Cited

U.S. PATENT DOCUMENTS

| 7,451,357 B2 * | 11/2008 | Dickenson ......... G06F 11/3636 714/45 |
| 7,475,401 B1 * | 1/2009 | Frey .................... G06F 11/3476 719/313 |

(Continued)

FOREIGN PATENT DOCUMENTS

EP    2956858 B1    12/2018

OTHER PUBLICATIONS

Ip.com, Dynamic Modification of Service/Application Logging Levels Based on Alerting Tools, Sep. 29, 2020.
(Continued)

*Primary Examiner* — Gabriel Chu
(74) *Attorney, Agent, or Firm* — Garg Law Firm, PLLC; Rakesh Garg; Lily Neff

(57) ABSTRACT

An embodiment includes detecting an application availability metric and a performance data metric of a system by a Tracing Policy Analyzer, responsive to detecting the application availability metric and the performance data metric, training a Bayesian optimization model of the Tracing Policy Analyzer based on the application availability metric and the performance data metric where the Bayesian optimization model outputs an optimal tracing policy. The embodiment includes detecting the optimal tracing policy by a Tracing Level Determination Module of an application of the system, responsive to detecting the optimal tracing policy, computing a computed tracing level by the Tracing Level Determination Module executing a k-nearest neighbors algorithm based on the optimal tracing policy. The
(Continued)

embodiment also includes tracing of the application of the system by a Tracer based on the computed tracing level.

20 Claims, 6 Drawing Sheets

(58) Field of Classification Search
CPC .............. G06F 11/3616; G06F 11/3636; G06F 2201/865; H04L 41/0604; H04L 41/0609
See application file for complete search history.

(56) References Cited

U.S. PATENT DOCUMENTS

| | | | |
|---|---|---|---|
| 8,423,973 | B2 | 4/2013 | Saunders et al. |
| 8,473,925 | B2 | 6/2013 | Gagliardi et al. |
| 9,535,780 | B2* | 1/2017 | Rajamanickam ... G06F 11/0787 |
| 9,634,920 | B1 | 4/2017 | Goldberg et al. |
| 10,360,124 | B2 | 7/2019 | Hitchcock et al. |
| 10,635,516 | B2* | 4/2020 | Jade .................... G06F 11/0754 |
| 11,163,624 | B2* | 11/2021 | Colgrove ............ G06F 11/0727 |
| 11,379,291 | B2* | 7/2022 | Badiger .............. G06F 11/0778 |
| 2002/0198983 | A1* | 12/2002 | Ullmann ............. G06F 11/3093 709/224 |
| 2004/0268314 | A1* | 12/2004 | Kollman ............. G06F 11/3476 714/E11.204 |
| 2008/0114571 | A1* | 5/2008 | Campbell .......... G05B 19/4183 702/189 |
| 2008/0126828 | A1* | 5/2008 | Girouard ............ G06F 11/3644 714/E11.178 |
| 2008/0168242 | A1* | 7/2008 | Eberbach ............ G06F 11/3495 711/E12.001 |
| 2009/0222492 | A1* | 9/2009 | Yamauchi ........... G06F 11/3476 |
| 2011/0067008 | A1* | 3/2011 | Srivastava .......... G06F 11/3466 717/128 |
| 2011/0270957 | A1* | 11/2011 | Phan ................... H04L 41/0622 709/224 |
| 2016/0132419 | A1* | 5/2016 | Reichart ............. G06F 11/3684 714/38.1 |
| 2017/0168917 | A1* | 6/2017 | Doi ..................... G06F 11/3698 |
| 2018/0067835 | A1 | 3/2018 | Hildebrand et al. |
| 2019/0286628 | A1* | 9/2019 | Zhou .................. G06F 11/0709 |
| 2019/0324649 | A1* | 10/2019 | Rodgers ................. G06F 9/544 |
| 2019/0332520 | A1 | 10/2019 | Myers et al. |
| 2021/0081271 | A1 | 3/2021 | Doshi et al. |
| 2021/0397500 | A1 | 12/2021 | Wieder et al. |
| 2024/0143431 | A1* | 5/2024 | Ye ....................... G06F 11/0784 |

OTHER PUBLICATIONS

Ip.com, System and Method for Cloud Monitoring Level Adjustment based on Learning, Dec. 17, 2021.

O'Reilly.com, Adaptive Sampling of Mastering Distributed Tracing, 2023, https://learning.oreilly.com/library/view/mastering-distributed-tracing/9781788628464/ch08.html#ch08lvl1sec74.

Sigelman et al., Dapper, a Large-Scale Distributed Systems Tracing Infrastructure, Google Technical Report dapper—Jan. 2010, Apr. 2010.

Guo et al., Graph-based Trace Analysis for Microservice Architecture Understanding and Problem Diagnosis, ESEC/FSE '20, Nov. 8-13, 2020.

* cited by examiner

DYNAMICALLY ADJUSTING TRACING DECISIONS BASED ON THE COLLECTED MONITORING DATA

BACKGROUND

The present invention relates generally to artificial intelligence. More particularly, the present invention relates to a method, system, and computer program for Dynamically Adjusting Tracing Decisions Based on the Collected Monitoring Data.

Information Technology (IT) systems are comprised of numerous applications, and the performance of each application is influenced by multiple factors, including but not limited to central processing unit (CPU), memory, storage, input and output, network, variable runtime workload, and business failures. Applications in IT system may have complicated dependencies, the runtime issue of one application may affect others. Real-time application performance monitoring can track the end-to-end business flows of complex applications and aid in identifying runtime issues.

SUMMARY

The illustrative embodiments provide for Dynamically Adjusting Tracing Decisions Based on the Collected Monitoring Data. An embodiment includes detecting an application availability metric and a performance data metric of a system by a Tracing Policy Analyzer, responsive to detecting the application availability metric and the performance data metric, training a Bayesian optimization model of the Tracing Policy Analyzer based on the application availability metric and the performance data metric wherein the Bayesian optimization model outputs an optimal tracing policy. The embodiment includes detecting the optimal tracing policy by a Tracing Level Determination of an application of the system, responsive to detecting the optimal tracing policy, computing a computed tracing level by the Tracing Level Determination Module executing a k-nearest neighbors algorithm based on the optimal tracing policy. The embodiment also includes tracing of the application of the system by a Tracer based on the computed tracing level.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
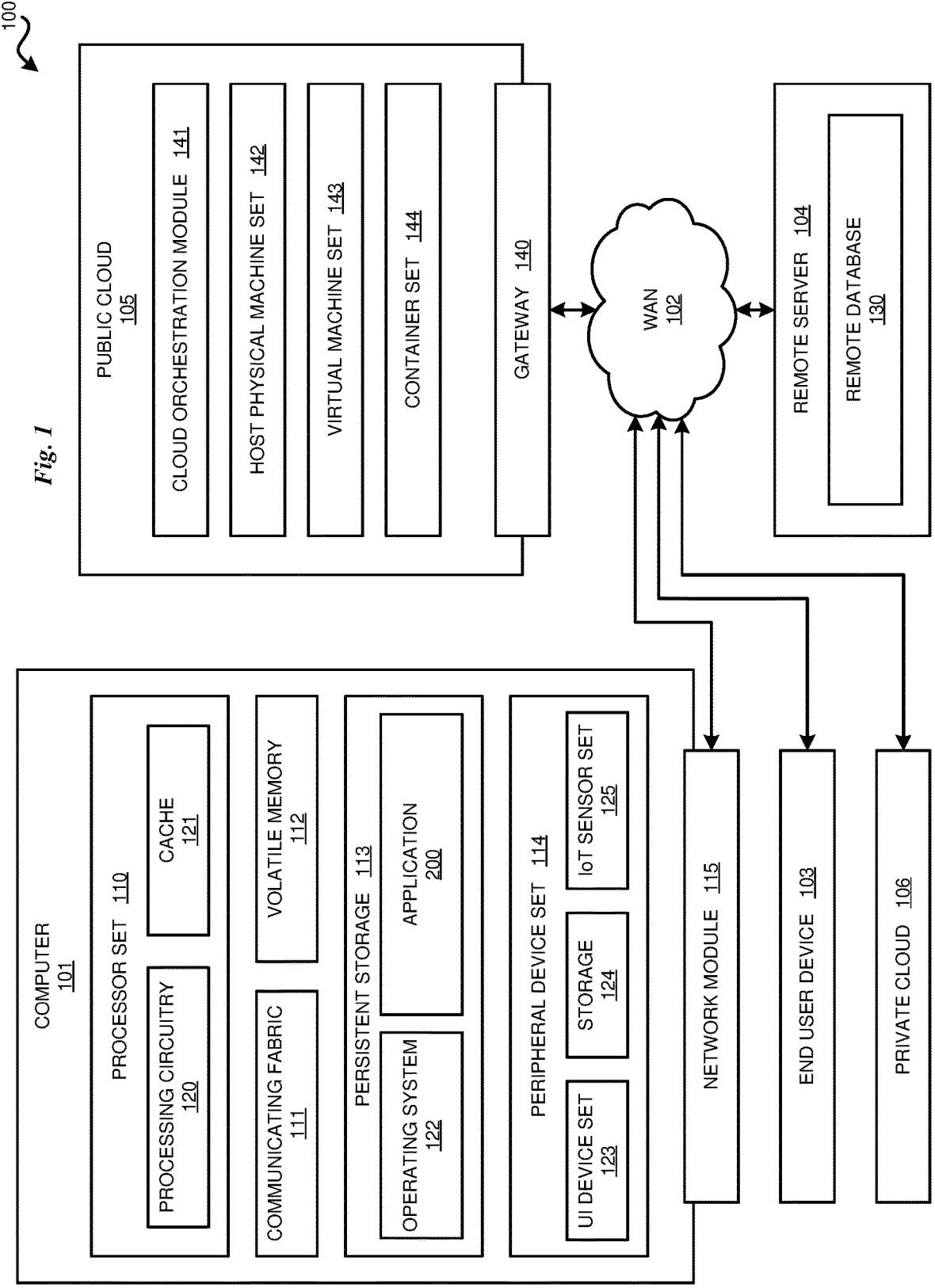
FIG. 1 depicts a block diagram of a computing environment in accordance with an illustrative embodiment.

Information Technology (IT) systems are comprised of numerous applications, and the performance of each application is influenced by multiple factors, including but not limited to CPU, memory, storage, IO, network, variable runtime workload, and business failures. Applications in IT system may have complicated dependencies, the runtime issue of one application may affect others. Real-time application performance monitoring can track the end-to-end business flows of complex applications and aid in identifying runtime issues.

The present disclosure addresses the deficiencies described above by providing a method, a machine-readable medium, and a system for Dynamically Adjusting Tracing Decisions Based on the Collected Monitoring Data. An embodiment includes detecting an application availability metric and a performance data metric of a system by a Tracing Policy Analyzer, responsive to detecting the application availability metric and the performance data metric, training a Bayesian optimization model of the Tracing Policy Analyzer based on the application availability metric and the performance data metric where the Bayesian optimization model outputs an optimal tracing policy. The embodiment includes detecting the optimal tracing policy by a Tracing Level Determination of an application of the system, responsive to detecting the optimal tracing policy, computing a computed tracing level by the Tracing Level Determination Module executing a k-nearest neighbors algorithm based on the optimal tracing policy. The embodiment also includes tracing of the application of the system by a Tracer based on the computed tracing level.

Illustrative embodiments include wherein the computed tracing level is adjusted based on a metric of the application.

Illustrative embodiments include wherein executing a k-nearest neighbor algorithm based on the tracing policy further comprises computing a distance metric between an application metrics vector and a tracing policy vector wherein the application metrics vector comprises a metric of the application and wherein the tracing policy vector comprises the optimal tracing policy.

Illustrative embodiments include wherein the tracing of the application by the Tracer further comprises tracing a component on which the application depends.

Illustrative embodiments include wherein computing the computed tracing level is based on a user-defined tracing policy.

Illustrative embodiments include wherein the application availability metric and the performance data metric comprise a key performance indicator and a health status of the application based on a metric, a log, and a topology data of the application and a service level agreement.

Illustrative embodiments also include wherein the tracing comprises an attribute with a predetermined tracing level higher than the computed tracing level.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 ("block 200") that provides Dynamically Adjusting Tracing Decisions Based on the Collected Monitoring Data. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

The process software Dynamically Adjusting Tracing Decisions Based on the Collected Monitoring Data is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 2:
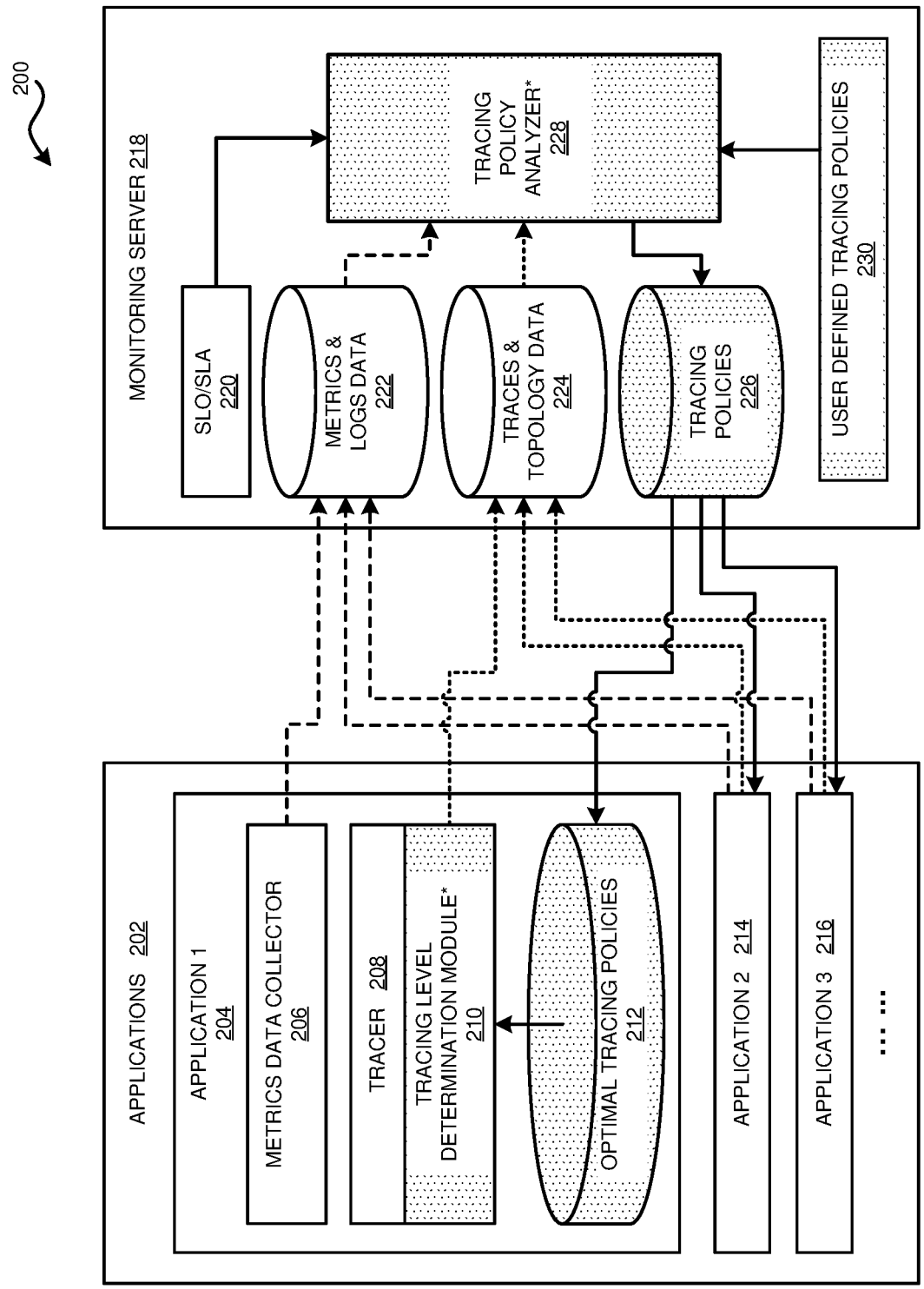
FIG. 2 depicts a system diagram in accordance with an illustrative embodiment.

FIG. 2 depicts a system diagram in accordance with an illustrative embodiment. In a particular embodiment, the components are representative of aspects of the application module 200 of FIG. 1.

In the illustrated embodiment, the Applications of the system 202 may comprise of many applications such as Application 1 204, Application 2 214, and Application 3 216. In an embodiment, Application 1 204 may comprise a Metrics Data Collector 206, Tracer 208, a Tracing Level Determination Module 210 that detects optimal Tracing Policies 212. The system of the illustrated embodiments a Monitoring Server 218 that may comprise a Tracing Policy Analyzer 228 that detects a service level objective (SLO) or service level agreement (SLA) 220, application and system metrics and log data 222, traces and topology data 224, one or more tracing policies 226, and user defined tracing policy 230.

In embodiments, the Optimal Tracing Policies 212 are computed from the Tracing Policies 226 for applications, that are optimized by the Bayesian optimization model. For a specified application 204, the optimal tracing policies 212 for the specific application type 212 will be synchronized to the application side.

Figure 3:
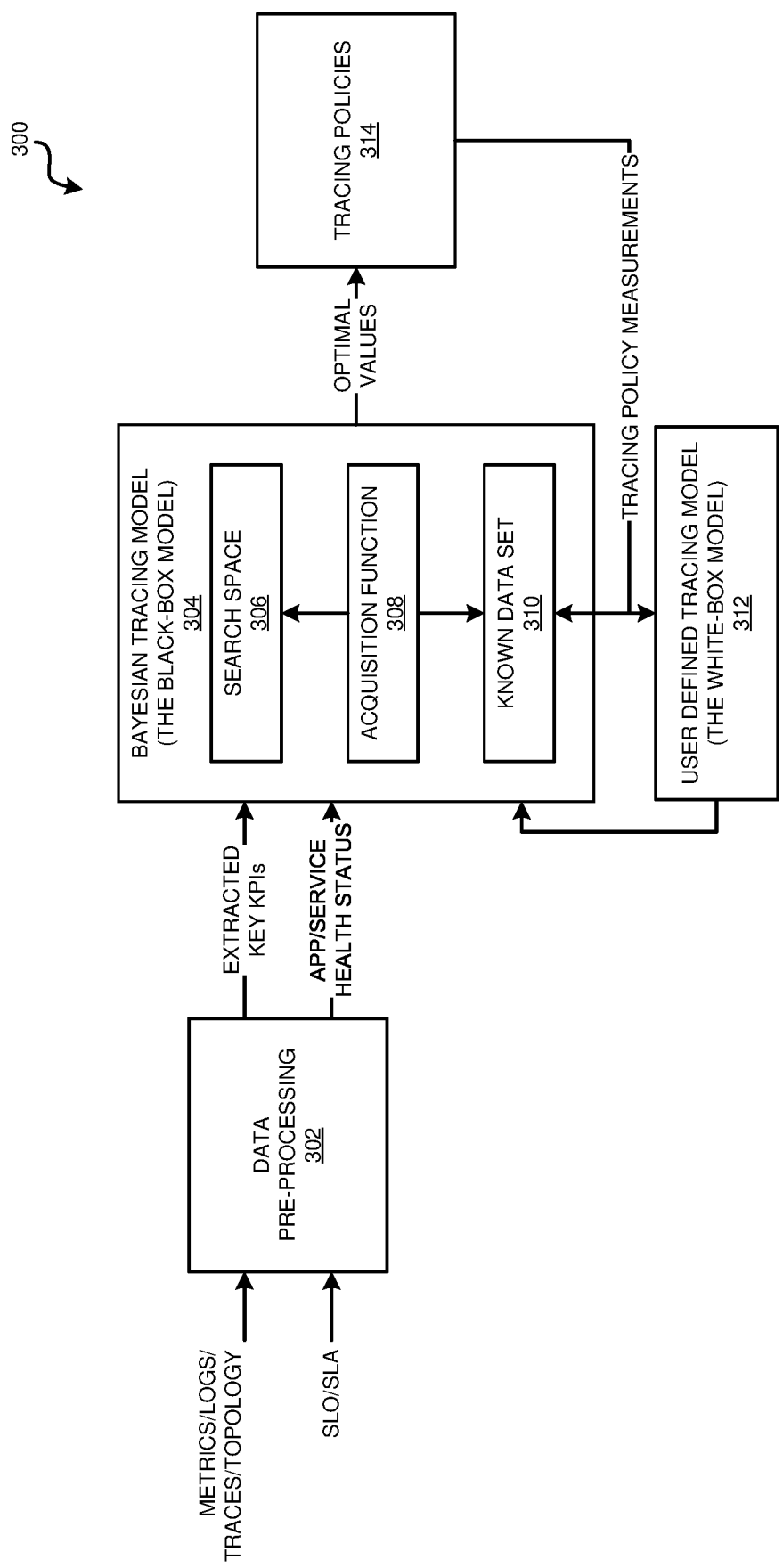
FIG. 3 depicts a flowchart diagram in accordance with an illustrative embodiment.

FIG. 3 depicts a flowchart diagram of a system 300 in accordance with an illustrative embodiment. In a particular embodiment, the components of the system 300 are representative of aspects of the application module 200 of FIG. 1.

In the illustrated embodiment, the data pre-processing 302 receives application metrics, application logs, and topology data of the application and SLO/SLA, and outputs an application availability metric and a performance data metric such as key performance indicators (KPI) and application/service health status as inputs to a Tracing Policy Analyzer 228 that comprises of a Bayesian Tracing Model 304 comprising of a search space 306, acquisition function 308, and a known dataset 310. The Bayesian Tracing Model 304 may also receive user defined tracing model 312.

In an embodiment, the Bayesian Tracing Model 304 is trained to analyze historical metrics, logs, and traces data of applications, and executes Bayesian Optimization to build a surrogate model to compute one or more optimal tracing policies 314 including different priorities for computing the tracing level for a request to an application. The user defined Tracing Model 312 may receive the user defined tracing policies for a specific application, and KPI metrics of user defined health status for the application. The user defined Tracing Model 312 may receive the optimal computed tracing policies 314 output from the model 314 as input to provide measurements and feedback for evaluation.

In an embodiment, machine learning (ML) training of the Bayesian Tracing Model 304 comprises executing Bayesian Optimization algorithm by constructing a surrogate model as a black box model to fit the relationship between the response time/resource factors, the SLA/SLO criteria and the tracing level criteria, define an acquisition function that can identify the response time/resource configuration from a search space and select as optimal values in the next loop of the execution. The returned value of acquisition function represents the expected improvement that could be gained by sampling a certain point in the search space. Higher values correspond to more promising points to sample, and define an objective function that can measure the actual tracing level policy of a running system with the selected response time/resource configuration/app health status. The model may be optimized for example by iterating the steps until a stopping criterion is reached, e.g.: a maximum number of iterations or a convergence threshold. Once the model is optimized, the optimal tracing policy is outputted.

An exemplary embodiment of the input and output of the Tracing Policy Analyzer 228 is illustrated in the table below:

| Policy Action Examples: | |
| --- | --- |
| Input: | |
| Metrics, logs and traces (including topologies) data collected by the monitoring system. SLA/SLO requirements. User defined tracing policies. | Application tracing policies priorities. Proactively lower tracing level in application peak Time. Proactively raise tracing level in application idle Time. Turn off tracing if the CPU/Memory usage is greater than a specific value. Turn off tracing when SLA/SLO requirements are about to be missed. Raise tracing level if the short-term average response time is increasing and the resource usage is not high. Lower tracing level if the number of requests is increasing along with the increased resource usage. Tentatively raise tracing level for the upstream and downstream applications if an application cannot properly handle incoming requests. Tentatively turn off tracing or lower tracing level for all applications if the Monitoring Server is in abnormal states. For example, the traces data storage is nearly full, or too much requests for the services processing traces data. Any other tracing policies provided by customers. |
| Operations: | |
| Analyze the application monitoring data as below Peak time and idle time. Long term (last 24 hours and beyond) average CPU/Memory usage. Long term (last 24 hours and beyond) average response time. Short term (last 5 minutes) average response time. The expected resource usage with specific workloads. The relationships of the applications from the topology data. The upstream and | |

-continued

Policy Action Examples:

downstream applications of
a problematic request in an
application
Generate/Update system
application tracing polies and
store them in storage.
Accept custom tracing policies
provided by customers.
Output A set of optimal Tracing Policies -
Pm(Pm$_1$, Pm$_2$, . . . Pm$_n$, T4)

Figure 4:
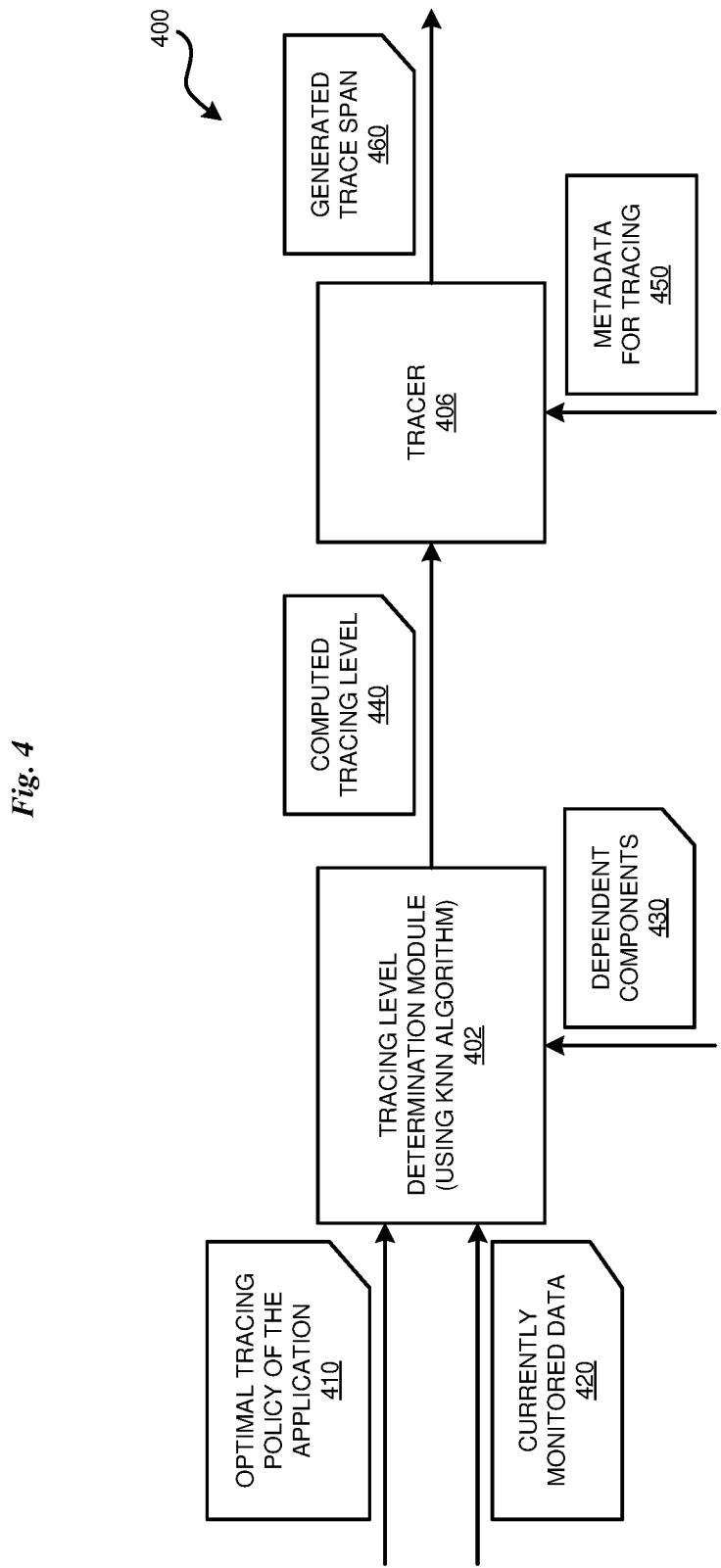
FIG. 4 depicts a flowchart diagram in accordance with an illustrative embodiment.

FIG. 4 depicts a flowchart diagram 400 in accordance with an illustrative embodiment. In a particular embodiment, the components of the flowchart diagram 400 are representative of aspects of the application module 200 of FIG. 1.

In the illustrated embodiment, the Tracing Level Determination Module 402 detects the optimal tracing policy of the application 410, currently monitored data 420, and information about the other components on which the application depends 430. The Tracing Level Determination Module 402 computes a tracing level 440 using the k-nearest neighbors algorithm (k-NN) and adjusts the computed tracing level using a rule-based mechanism if necessary. In most cases, the computed tracing level computed by the k-NN algorithm is directly used by the Tracer 406. In an embodiment, the distance metric of the k-NN algorithm may comprise Euclidean distance. In other embodiments, the distance metric may be Manhattan distance, Minkowski distance, and Hamming distance.

In some embodiments, executing a k-nearest neighbor algorithm based on the optimal tracing policies further comprises computing a distance metric between an application metrics vector and a tracing policy vector wherein the application metrics vector comprises a metric of the application and wherein the tracing policy vector comprises the optimal tracing policies. For example, obtain the status set vector (A) of the current application from the monitoring data. The status set is an n-dimensional vector A (A1, A2, . . . An). Ai is the monitoring metrics of the application, such as CPU/Mem/Disk usage, response time. Obtain the status set vectors of all active tracing policies for the current application from the tracing policy storage as m (n+1)-dimensional vectors. The last attribute of the vector is the tracing level with the specific tracing level. For example, P1(P1$_1$, P1$_2$, . . . P1$_n$, T1)
P2 (P2$_1$, P2$_2$, . . . P2$_n$, T2)
. . .
Pm(Pm$_1$, Pm$_2$, . . . Pm$_n$, T4) wherein T1, T2 and T4 are the tracing level labels.

Calculate the distance metric such as Euclidean Distance between the status set vector of the current application (A) and the status set vector of each active tracing policies (Pj). Among the K nearest tracing policies, classify them based on the tracing level labels, and count the number of tracing policies for each tracing level label. Identify the tracing level label with the highest count and set it as the current application's tracing level. If K=5 and out of the five nearest tracing policies to A, 4 of them have the tracing level label T2, then set the current application's tracing level to T2.

In some embodiments, the tracing level may be adjusted when a metric of the application such as the components on which the application depends are in poor health. For example, the rule may raise the tracing level relatively for applications that directly depend on components with poor health. If any of the dependency components is located in the hot-spot area and has the highest tracing level (L4), adjust the current tracing level to L3 if the value determined by the k-NN algorithm is lower than L3. In some embodiments, the Tracer 406 may detect metadata for tracing 450 and generates a trace span 460. For example, tracing data (spans) for the operations in an application to provide detailed information about what is happening for the requests in the application. In some embodiments, spans represent the timing of code executions; in other words, an action with a start and end time. Spans also contains payloads with component attributes.

Figure 5:
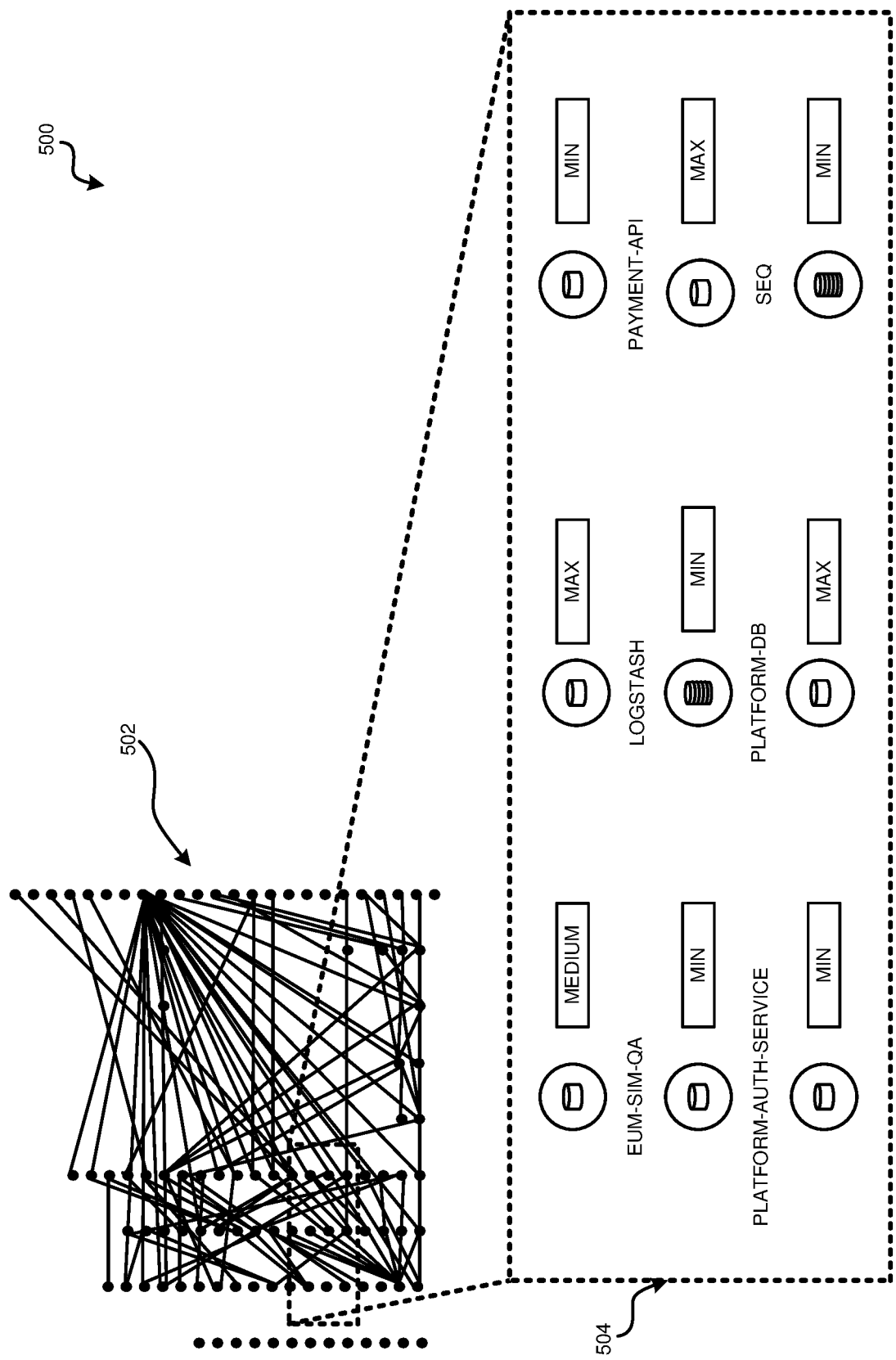
FIG. 5 depicts a component diagram in accordance with an illustrative embodiment.

FIG. 5 depicts a component diagram 500 in accordance with an illustrative embodiment. In a particular embodiment, the components of the component diagram 500 are representative of aspects of the application module 200 of FIG. 1.

In the illustrated embodiment, the subset 504 of the topology of components 502 shows the application of the system, the dependencies and data flow between various components. Based on the tracing policies generated by the Tracing Policy Analyzer module, the Tracing Level Determination module in the tracer side dynamically sets the tracing level for each component using the k-NN algorithm. As shown in the topology, each component is assigned a specific tracing level.

In an embodiment, the Tracer may dynamically generate tracing span payload based on the current tracing level. For example, the tracing span payload includes attributes with a predetermined tracing level equal to or higher than the computed tracing level. In an example, if tracing level=Min, only the Min attributes will be collected, if tracing level=Med, the Min and Med attributes will be collected. If tracing level=Max, all attributes, Min, Med and Max will be collected.

Figure 6:
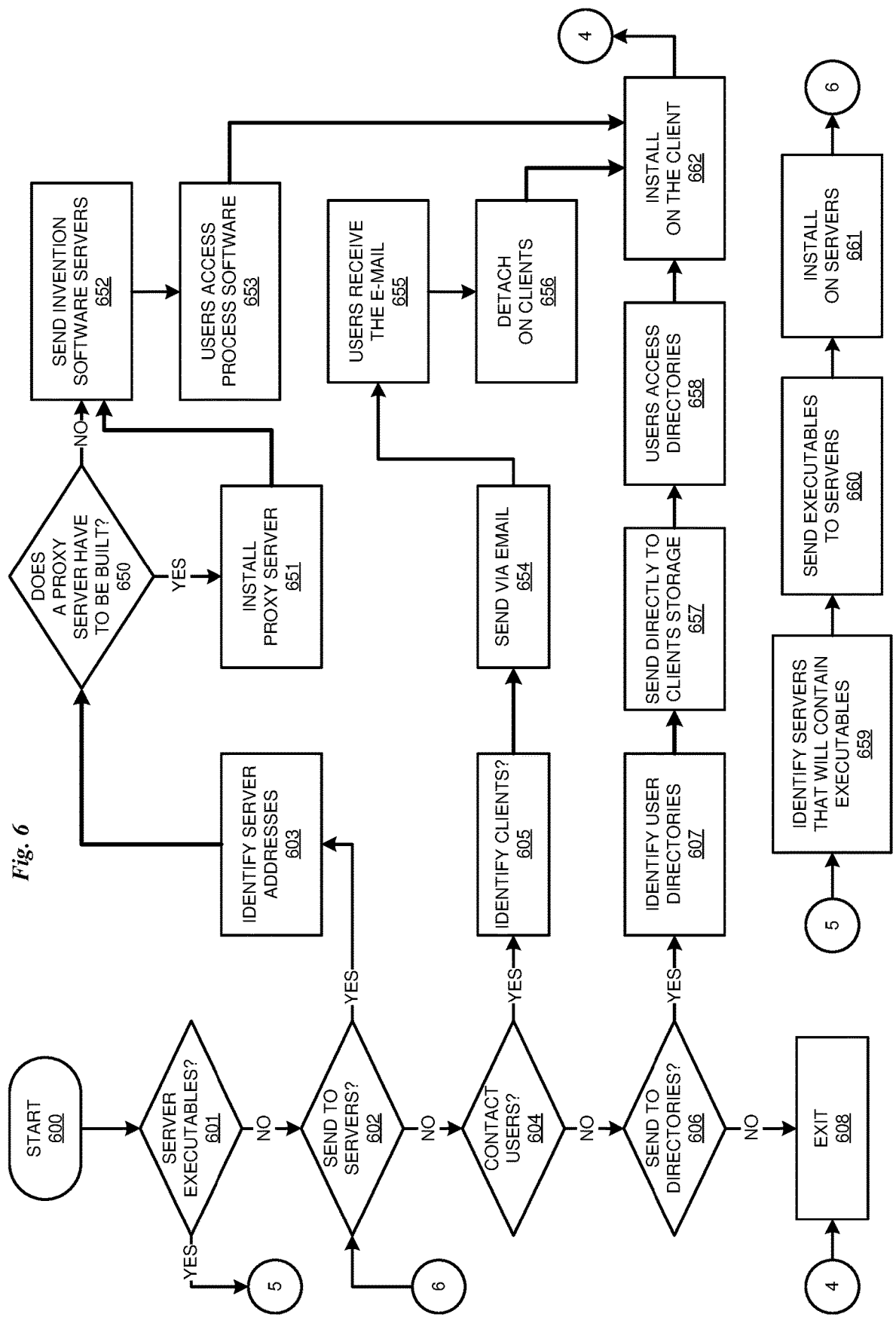
FIG. 6 depicts a flowchart diagram of an example Deployment process in accordance with an illustrative embodiment.

FIG. 6 depicts a flowchart diagram of an example Deployment process in accordance with an illustrative embodiment.

INTRODUCTION

Loading the process software directly on the client, server, and proxy computers by loading a storage medium such as a CD, DVD, etc.

Automatically or semi-automatically deploying the process software into a computer system by sending it to a central server or a group of central servers. The process software is then downloaded into the client computers that will execute the process software.

Sending the process software directly to the client system via e-mail. The process software is then either detached to a directory or loaded into a directory by executing a set of program instructions that detaches the process software into a directory.

Sending the process software directly to a directory on the client computer hard drive.

When there are proxy servers, the process will select the proxy server code, determine on which computers to place the proxy servers' code, transmit the proxy server code, and then install the proxy server code on the proxy computer. The process software will be transmitted to the proxy server and then it will be stored on the proxy server.

While it is understood that the process software Dynamically Adjusting Tracing Decisions Based on the Collected Monitoring Data may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 600 begins the deployment of the process software. An initial step is to determine if there are any programs that will reside on a server or servers when the process software is executed (601). If this is the case, then the servers that will contain the executables are identified (659). The process software for the server or servers is transferred directly to the servers' storage via FTP or some other protocol or by copying though the use of a shared file system (660). The process software is then installed on the servers (661).

Next, a determination is made on whether the process software is to be deployed by having users access the process software on a server or servers (602). If the users are to access the process software on servers, then the server addresses that will store the process software are identified (603).

A determination is made if a proxy server is to be built (650) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (651). The process software is sent to the (one or more) servers either via a protocol such as FTP, or it is copied directly from the source files to the server files via file sharing (652). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (653). Another embodiment is to have the servers automatically copy the process software to each client and then run the installation program for the process software at each client computer. The user executes the program that installs the process software on his client computer (662) and then exits the process (608).

In step 604 a determination is made whether the process software is to be deployed by sending the process software to users via e-mail. The set of users where the process software will be deployed are identified together with the addresses of the user client computers (605). The process software is sent via e-mail to each of the users' client computers (654). The users then receive the e-mail (655) and then detach the process software from the e-mail to a directory on their client computers (656). The user executes the program that installs the process software on his client computer (662) and then exits the process (608).

Lastly, a determination is made on whether the process software will be sent directly to user directories on their client computers (606). If so, the user directories are identified (607). The process software is transferred directly to the user's client computer directory (657). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (658). The user executes the program that installs the process software on his client computer (662) and then exits the process (608).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   detecting an application availability metric and a performance data metric of a system by a Tracing Policy Analyzer;
   responsive to detecting the application availability metric and the performance data metric, training a Bayesian optimization model of the Tracing Policy Analyzer based on the application availability metric and the performance data metric wherein the Bayesian optimization model outputs an optimal tracing policy;
   detecting the optimal tracing policy by a Tracing Level Determination Module of an application of the system;
   responsive to detecting the optimal tracing policy, computing a computed tracing level by the Tracing Level Determination Module executing a k-nearest neighbors algorithm based on the optimal tracing policy; and
   tracing of the application of the system by a Tracer based on the computed tracing level.

2. The computer-implemented method of claim 1, wherein the computed tracing level is adjusted based on a metric of the application.

3. The computer-implemented method of claim 1, wherein executing a k-nearest neighbor algorithm based on the optimal tracing policy further comprises computing a distance metric between an application metrics vector and a tracing policy vector wherein the application metrics vector comprises a metric of the application and wherein the tracing policy vector comprises the optimal tracing policy.

4. The computer-implemented method of claim 1, wherein the tracing of the application by the Tracer further comprises tracing a component on which the application depends.

5. The computer-implemented method of claim 1, wherein computing the computed tracing level is based on a user-defined tracing policy.

6. The computer-implemented method of claim 1, wherein the application availability metric and the performance data metric comprise a key performance indicator and a health status of the application based on a metric, a log, and a topology data of the application and a service level agreement.

7. The computer-implemented method of claim 1, wherein the tracing comprises an attribute with a predetermined tracing level higher than the computed tracing level.

8. A computer program product comprising one or more computer readable storage media, and program instructions collectively stored on the one or more computer readable storage media, the program instructions executable by a processor to cause the processor to perform operations comprising:
   detecting an application availability metric and a performance data metric of a system by a Tracing Policy Analyzer;
   responsive to detecting the application availability metric and the performance data metric, training a Bayesian optimization model of the Tracing Policy Analyzer based on the application availability metric and the performance data metric wherein the Bayesian optimization model outputs an optimal tracing policy;
   detecting the optimal tracing policy by a Tracing Level Determination Module of an application of the system;
   responsive to detecting the optimal tracing policy, computing a computed tracing level by the Tracing Level Determination Module executing a k-nearest neighbors algorithm based on the optimal tracing policy; and
   tracing of the application of the system by a Tracer based on the computed tracing level.

9. The computer program product of claim 8, wherein the computed tracing level is adjusted based on a metric of the application.

10. The computer program product of claim 8, wherein executing a k-nearest neighbor algorithm based on the optimal tracing policy further comprises computing a distance metric between an application metrics vector and a tracing policy vector wherein the application metrics vector comprises a metric of the application and wherein the tracing policy vector comprises the optimal tracing policy.

11. The computer program product of claim 8, wherein the tracing of the application by the Tracer further comprises tracing a component on which the application depends.

12. The computer program product of claim 8, wherein computing the computed tracing level is based on a user-defined tracing policy.

13. The computer program product of claim 8, wherein the application availability metric and the performance data metric comprise a key performance indicator and a health status of the application based on a metric, a log, and a topology data of the application and a service level agreement.

14. The computer program product of claim 8, wherein the tracing comprises an attribute with a predetermined tracing level higher than the computed tracing level.

15. A computer system comprising a processor and one or more computer readable storage media, and program instructions collectively stored on the one or more computer readable storage media, the program instructions executable by the processor to cause the processor to perform operations comprising:
　　detecting an application availability metric and a performance data metric of a system by a Tracing Policy Analyzer;
　　responsive to detecting the application availability metric and the performance data metric, training a Bayesian optimization model of the Tracing Policy Analyzer based on the application availability metric and the performance data metric wherein the Bayesian optimization model outputs an optimal tracing policy;
　　detecting the optimal tracing policy by a Tracing Level Determination Module of an application of the system;
　　responsive to detecting the optimal tracing policy, computing a computed tracing level by the Tracing Level Determination Module executing a k-nearest neighbors algorithm based on the optimal tracing policy; and
　　tracing of the application of the system by a Tracer based on the computed tracing level.

16. The computer system of claim 15, wherein the computed tracing level is adjusted based on a metric of the application.

17. The computer system of claim 15, wherein executing a k-nearest neighbor algorithm based on the optimal tracing policy further comprises computing a distance metric between an application metrics vector and a tracing policy vector wherein the application metrics vector comprises a metric of the application and wherein the tracing policy vector comprises the optimal tracing policy.

18. The computer system of claim 15, wherein the tracing of the application by the Tracer further comprises tracing a component on which the application depends.

19. The computer system of claim 15, wherein the application availability metric and the performance data metric comprise a key performance indicator and a health status of the application based on a metric, a log, and a topology data of the application and a service level agreement.

20. The computer system of claim 15, wherein the tracing comprises an attribute with a predetermined tracing level higher than the computed tracing level.

* * * * *